United States Patent [19]

McKinlay

[11] Patent Number: 5,626,449
[45] Date of Patent: May 6, 1997

[54] WEDGE-LOCKING FASTENER ASSEMBLY WITH A CAMMED FLANGE

[75] Inventor: Alistair N. McKinlay, Marina Del Rey, Calif.

[73] Assignee: Hong Kong Disc Lock Company Limited, Hong Kong, Hong Kong

[21] Appl. No.: 528,857

[22] Filed: Sep. 15, 1995

[51] Int. Cl.⁶ .......................... F16B 39/24; F16B 43/00
[52] U.S. Cl. ...................... 411/149; 411/136; 411/533
[58] Field of Search ........................... 411/134, 135, 411/136, 149, 150, 161, 533, 5

[56] References Cited

U.S. PATENT DOCUMENTS

| | | | |
|---|---|---|---|
| 3,417,802 | 12/1968 | Oldenkott. | |
| 3,895,663 | 7/1975 | Bashline et al. | 411/136 |
| 3,926,237 | 12/1975 | Enders. | |
| 4,362,449 | 12/1982 | Hlinsky | 411/156 |
| 4,538,313 | 9/1985 | Frieberg | 411/149 X |
| 4,793,752 | 12/1988 | Frieberg | 411/161 |
| 5,080,545 | 1/1992 | McKinlay | 411/149 |
| 5,108,238 | 4/1992 | Ewing | 411/5 |
| 5,190,423 | 3/1993 | Ewing | 411/134 |
| 5,203,656 | 4/1993 | McKinlay | 411/149 |
| 5,314,279 | 5/1994 | Ewing | 411/134 |
| 5,409,338 | 4/1995 | McKinlay | 411/149 |
| 5,474,409 | 12/1995 | Terry | 411/149 X |

*Primary Examiner*—Neill R. Wilson
*Attorney, Agent, or Firm*—Charles W. Chandler

[57] ABSTRACT

A wedge-type flanged fastener assembly is provided for holding two or more workpieces together without loosening due to vibration or shock forces. The assembly includes a nut and lock washer having mating cam surfaces contoured to achieve a high strength wedge lock resistance to unloosening movement of the nut. The lock washer is captively retained on the nut by an annular flange extending from the nut through the central opening in the washer. Several variations of a flanged wedge type fastener are disclosed.

13 Claims, 5 Drawing Sheets

WEDGE-LOCKING FASTENER ASSEMBLY WITH A CAMMED FLANGE

BACKGROUND AND SUMMARY OF THE INVENTION

This invention relates to a wedge locking fastener assembly in which one set of wedging cams are carried on the flange of either a nut or the head of a bolt.

Fastener assemblies having cam wedge locking surfaces are known in the art. For example, U.S. Pat. No. 3,263,727 to A. Herpolsheimer shows a fastener assembly that includes two lock washers having mating cam surfaces. My issued U.S. Pat. No. 5,080,545 shows a fastener assembly wherein two lock washers with mating cam surfaces are engaged between a nut and the workpiece.

Other U.S. patents showing wedge locking fasteners are Oldenkot U.S. Pat. No. 3,417,802; Enders U.S. Pat. No. 3,926,237; Hlinsky U.S. Pat. No. 4,362,449; Frieberg U.S. Pat. No. 4,793,752, and Ewing U.S. Pat. Nos. 5,190,423 and 5,314,279, usually characterized by the cams being carried on the two halves of a hexagonal head.

SUMMARY OF THE INVENTION

The present invention is directed to a wedge locking fastener assembly in which at least one of the components has a multi-sided, wrench engaging head and an integral washer or flange that engages a separate washer between the head and the workpiece.

When the invention is embodied in a nut, the lock washer is preferably captively retained on the nut, so that both the nut and the lock washer is preferably captively retained on the nut, so that both the nut and the lock washer can be tightened as a unit.

The nut head of a preferred embodiment has a hexagonal configuration. The base of the nut has a circular integral flange, generally the same diameter and thickness as the separate companion camming lock washer. The flange which carries the cams, provides a greater camming area than, for example, taught by Frieberg U.S. Pat. No. 4,793, 752 in which the camming area is limited by the smaller area of the hexagonal head of the nut. The greater camming area provides a better wedging action. The washer may have either a flat or a ribbed work-engaging surface depending on the workpiece material and finish.

The flange can be employed on either a nut or the underside of a hex head bolt. In either case, both the flange and the loose washer have confronting cam surfaces so that the fastener head becomes wedged between the loose washer and the threads of either a bolt, or in some cases a tapped hole of a workpiece.

I have found that a cammed flange, equivalent to a round washer that is integral with a fastener such as a nut, functions in a different manner than a pair of rotatable camming members that are separate from the hex head member that is being wedged. For example, if a bolt is used to fasten a workpiece between a non-flanged hex head nut with a two piece cam washer unit, and the hex head of the bolt, a conventional hex head nut must be tightened with a wrench to avoid slippage. However, a hex head nut with an integral flange and a single washer can be hand tightened to achieve the wedge locking function, even when the workpiece surface has a layer of oil. This invention uses various forms of this integral flanged structure.

The flanged nut and washer are used with a bolt preferably having a button head, which is useful as a rivet replacement on heavy equipment, such as railroad cars, when the conventional heavy duty rivet apparatus is not conveniently available.

Another embodiment of the invention comprises a fastener assembly in which the flanged camming nut with a companion cammed washer cooperates with a bolt having a conventional flat bottomed flanged hex head to fasten a pair of workpieces together. In this embodiment, the fastener can be disassembled by holding the nut in a fixed position, and then rotating the hex head of the bolt on the opposite side of the workpiece, in the unwinding direction.

In another embodiment of the invention, the flanged camming nut and the washer are combined with a flanged camming hexagonal head bolt. The nut and washer are mounted on one side of the workpiece. The bolt head on the opposite side of the workpiece has a cammed surface which cooperates with a separate camming lock washer. Consequently, a pair of cooperating wedge locking fasteners, mounted on both sides of the workpiece, provide a permanent fastener that cannot be readily unfastened except by elongating the bolt. This fastener is also useful as a replacement for rivets commonly employed on heavy equipment, such as trucks.

Another embodiment of the invention, employs the camming flange nut with its companion lock washer on the end of a conventional hex head bolt on one side of the workpiece. The bolt head has a flange with a flat bottom and a pair of cooperating conventional wedge locking washers. Thus, wedge locking fasteners are mounted on both sides of the workpiece, providing a permanent fastening assembly.

In another embodiment of the invention, the flanged camming nut and a companion lock washer are mounted on one end of a bolt. The bolt has a two piece wedge locking head and a separate wedge locking washer. One half of the bolt head is attached to the bolt shank and forms a wedge lock with the other half of the head which is rotatable on the shank. The rotatable half of the head also has a flange with a second set of smaller (mini) cams that engage a washer having an annular array of smaller cams. Consequently, the bolt head side of the fastener has a dual locking arrangement. As the head of the bolt is initially tightened, the mini cams immediately secure the washer to the workpiece so that the washer does not slide and scratch the workpiece. As the bolt head is further tightened, the two halves of the head become mated to form a permanent fastener.

A still further version of the invention employs a bolt having a flanged head, which like the flanged nut, has a camming surface engaging a complementary surface on a washer. The bolt can be used without a nut, such as in a blind tapped hole. The head of the bolt is wedge between the threads in the hole and the cams on the washer.

All of the wedge locking fasteners employ the concept of an annular array of confronting cams with inclined ramps arranged to slideably engage one another in such a manner that as the fastener is exposed to vibration, any tendency of the fastener to either elongate or become unwound causes the cams to wedge the fastener tighter.

Further features and details of the invention will be apparent from the attached drawings and description of preferred embodiments of the invention.

DESCRIPTION OF THE DRAWINGS

The description refers to the accompanying drawings in which like reference characters refer to like parts throughout the several views, and in which.

DESCRIPTION OF A PREFERRED EMBODIMENT

Figure 1:
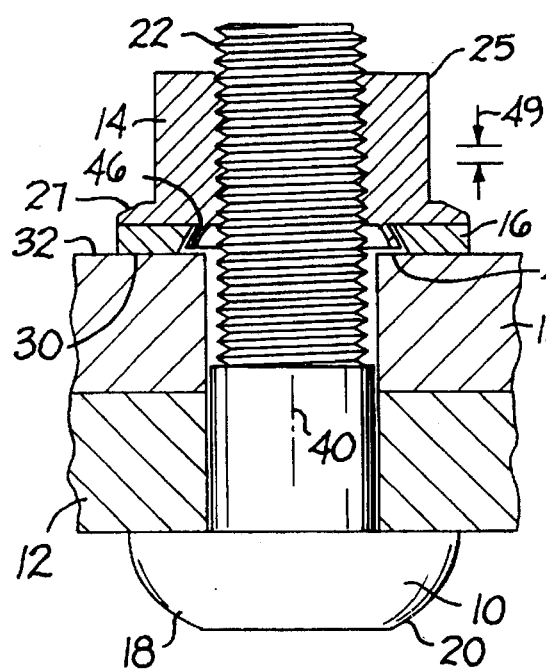
FIG. 1 is a sectional view taken through a fastener assembly constructed according to the invention. The fastener assembly is shown securing two workpieces together.
Figure 2:
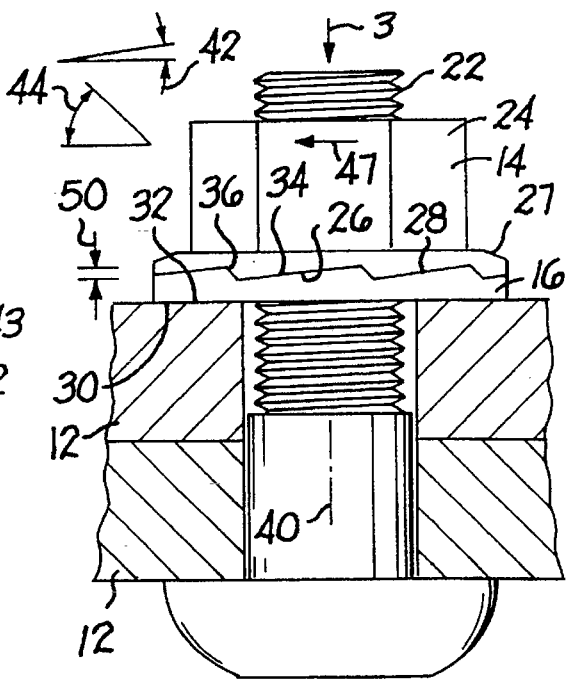
FIG. 2 is a view taken in the same direction as FIG. 1, but showing a nut and look washer combination in side elevation.

FIGS. 1 and 2 show a fastener assembly constructed according to the present invention. The fastener assembly comprises a steel button-headed bolt 10 having a threaded shank extending through two workpieces 12, 12; a steel nut 14 threaded on the shank; and a non-flexing steel lock washer 16 interposed between the nut and one of the workpieces. Lock washer 16 is captively retained on nut 14. Retention of the lock washer on the nut facilitates handling and manipulation of the nut-lock washer assembly during storage and installation, and prevents the washer from being mounted in a reversed position on the bolt.

Bolt 10 has a button-shaped head 18 having a rounded exposed surface 20, and a threaded shank 22 extending axially from head 18. The rounded surface contour on head 18 resists being gripped by a wrench or pliers. Head 18 has the general appearance of a rivet head.

Nut 14 has an internal threaded surface meshed with the continuous helical thread on shank 22 by application of a wrench to flat multi-sided external surfaces 24 on nut head 25. Preferably, the nut has a hexagonal shaped head.

Nut 14 has an end camming face 26 forged on an annular flange 27. Flange 27 has a diameter larger than the maximum diameter of the nut head and the same as the lock washer diameter. The flange configuration is similar to having a washer integral with the nut head. Consequently, the circular bottom face of the flange has a substantially larger surface area than the hexagonal cross section of the nut head. End face 26 engages a mating camming end face 28 on lock washer 16.

Figure 7:
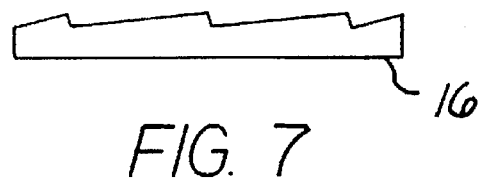
FIG. 7 is a side view of the lock washer in FIGS. 1 and 6.
Figure 8:
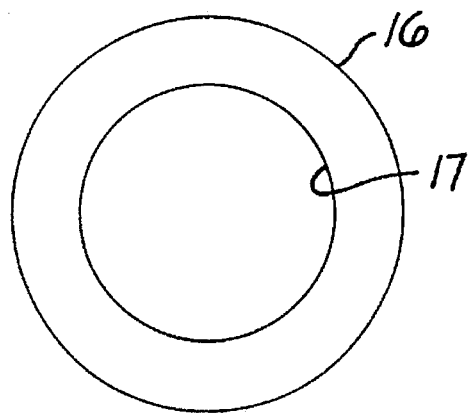
FIG. 8 is a bottom view of the look washer of FIG. 7.

The lower face 30 of the lock washer is flat (not serrated) for frictionally engaging surface 32 of the uppermost workpiece 12. Lock washer 16 is illustrated in FIG. 7 and 8. Washer 16 has a central opening 17 with a diameter larger than the diameter of the bolt shank.

Each camming end surface 26 or 28 comprises a plural number of circumferentially-spaced flat ramps 34, and a corresponding number of interconnecting flat shoulders 36. In the illustrated construction, each end face has eight slightly sloped ramps 34 and the same number of steeply sloped shoulders 36. Both the ramps and the shoulders are inclined in the direction of the nut's rotational axis.

The slope angle of each ramp is approximately 8°, and the slope angle of each shoulder 36 is approximately 45°. The term "slope angle" designates the angle that the respective cam surface (34 or 36) makes with respect to an imaginary radial plane extending normal to the rotational axis 40 of the shank and the fastener assembly. Numeral 42 represents the slope angle of each ramp 34; and numeral 44 represents the slope angle of each flat shoulder 36.

Shoulders 36 and ramps 34 in each camming surface are connected at acute angles, so that the respective cam surface has a continuous, uninterrupted undulating contour. There are no obstructions or ledges preventing relative rotation between the nut and lock washer when the cammed surfaces are interengaged, as shown in FIG. 2.

The fastener can also function with a single ramp and shoulder on the camming surface of the flange and the washer, or a greater number than shown in FIGS. 1 and 2.

As shown in FIG. 1, nut 14 has an annular bottom flared pilot 46 extending from the nuts threaded inner opening into a frusto-conical opening 43 in the lock washer such that lock washer 16 is loosely retained on the nut. Pilot 46 is angled and spaced from the internal annular edge of the look washer, whereby the lock washer can move toward or away from the nut in the direction of axis 40. Pilot 46 can be angled by a swaging operation performed after the look washer has been placed on the nut.

Nut 14 is threaded onto shank 22 by rotating the nut in the clockwise direction indicated by arrow 47 (FIG. 2). During the nut-tightening operation, the bottom flat face 30 on the washer becomes frictionally anchored to surface 32 on the associated workpiece. Further rotation of the nut in the arrow 47 direction causes the shoulders on the nut to push shoulders 36 on the look washer until the nut is fully tightened.

Figure 3:
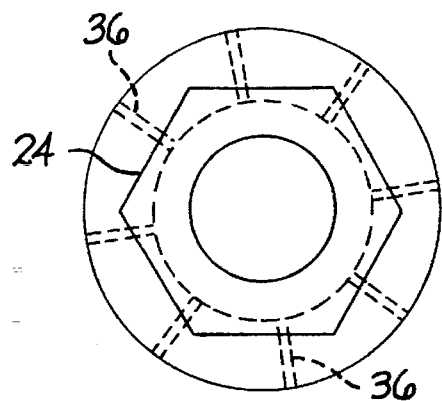
FIG. 3 is an end view of the FIG. 1 fastener assembly taken in the direction of arrow 3 in FIG. 2.

When the nut is rotated in the loosening or counter-clockwise direction, as viewed in FIG. 3, that is opposite to arrow 47, either by vibration or deliberately, the ramps on the nut slide up the ramps on the washer. The nut moves to a wedged, locked position between the washer ramps and the threads on shank 22. The lock action is enhanced by the fact that the axial thickness dimensions of shoulders 36 is less than the thread pitch distance of the threads on shank 22. In the drawings, numeral 49 represents the thread pitch distance, whereas numeral 50 represents the axial thickness dimensions of shoulders 36.

Typically, the threads on the shank and nut comprise sixteen threads per inch, which provides a thread pitch distance 49 of about 0.06". The cam surfaces on the nut and the lock washer will, in such case, have a shoulder axial thickness dimension less than 0.06", preferably about 0.04". The shoulder axial thickness dimension 50 is related to the thread pitch dimension, so that dimension 50 is less than dimension 49.

The relatively small shoulder thickness dimension 50 enables the nut 14 to cam up the ramp surfaces on the lock washer without excessive resistance or strain in shank 22.

Figure 4:
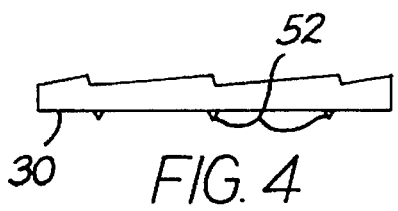
FIG. 4 is a side view of a ribbed lock washer that can be used in the FIG. 1 assembly as an alternative to the washer used in FIG. 1.
Figure 5:
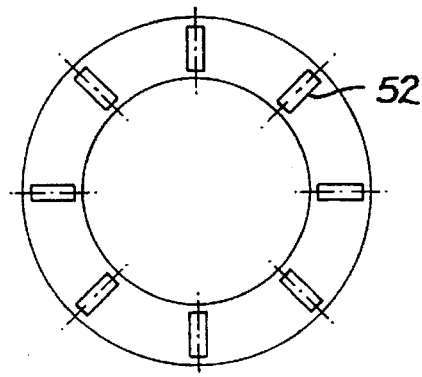
FIG. 5 is a bottom view of the look washer shown in FIG. 4.

For some situations, it may be desirable to provide radial gripping ribs on the work-engaging face of the lock washer. FIGS. 4 and 5 show representative ribs 52 formed on surface 30. Such ribs are provided (used) when the workpiece surface is relatively soft and will not acquire an undesirable stress concentration. The ribs penetrate the workpiece surface to enhance the configuration between the lock washer on the workpiece.

Workpieces having relatively soft surfaces in which the ribs would create an undesirable stress-concentration will accommodate flat-faced lock washers, as shown in FIGS. 1 and 2.

Figure 6:
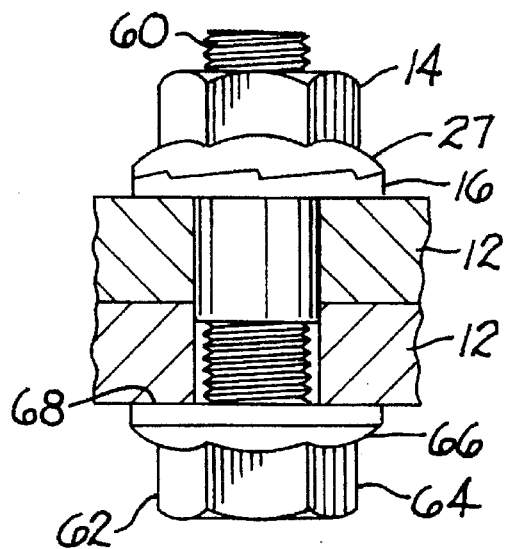
FIG. 6 is a partially sectional view through an alternative fastener assembly in which the bolt has a flanged hexagonal head.

FIG. 6 shows another embodiment of the invention in which nut 14 and lock washer 16 are mounted on threaded shank 60 of a conventional bolt 62 having a hexagonal head 64 for receiving a wrench or other similar tool. Bolt head 64 has an annular flange 66 having a diameter larger than the maximum diameter of the head and for illustrative purposes may have the same diameter as washer 16. Flange 16 has a flat work-engaging surface 68.

This embodiment of the invention functions in a similar manner to that of the version illustrated in FIG. 1, in that as nut 14 is tightened, the shoulders on flange 27 push the shoulders on the washer until the fastener is tightened. In response to vibration or an elongation of the threaded shank, any tendency of the nut to back off or unwind causes the ramps on the nut flange to slide up the ramps on the washer thereby wedging the nut between the threads on the shank and the washer ramps. However, unlike the embodiment of FIG. 1, which is basically a permanent fastener, the embodiment of FIG. 6 can be disassembled by holding nut 14 in a fixed position by a wrench and then using another wrench to turn the bolt head to unwind the shank from nut 14.

Figure 9:
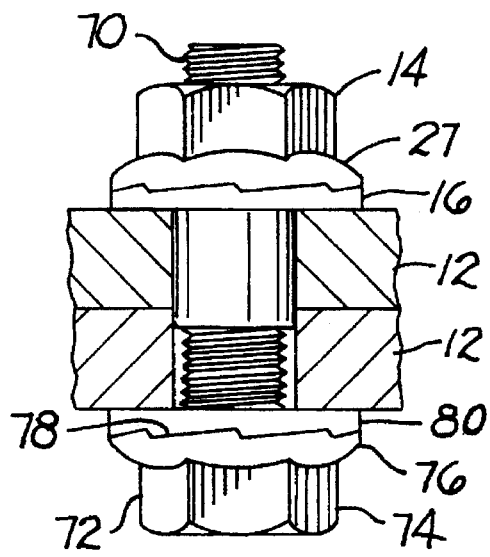
FIG. 9 is a view of another fastener assembly employing a flanged camming nut on one end of the bolt, and a flanged camming bolt head with a single separate washer on the opposite end of the bolt.

FIG. 9 illustrates another embodiment of the invention in which nut 14 and washer 16 are mounted on the threaded shank 70 of a bolt 72 having a hexagonal wrench engaging head 74. In this embodiment of the invention, bolt head 74 has an annular integral flange 76 with a diameter greater than the maximum diameter of the hexagonal head and preferably the same as the diameter of flange 27 of the nut. Flange 76 has a cammed surface 78 with ramps and shoulders identical to that on the cammed surface of nut flange 27.

A washer 80, identical to washer 16, is mounted between the flanged head of the bolt and the workpiece and functions such that any tendency of the bolt head to be unwound from the nut causes the bolt head to move axially as it is cammed up the ramps of washer 80 thereby causing the fastener to become wedged tighter.

This embodiment of the invention, unlike the embodiment of FIG. 6, cannot be unfastened even if a wrench is mounted on nut head 14 and a second wrench is mounted on bolt head 74. Thus, we have essentially a permanent fastener which can only be disassembled by elongating the shank of the bolt or by destroying the fastener.

Figure 10:
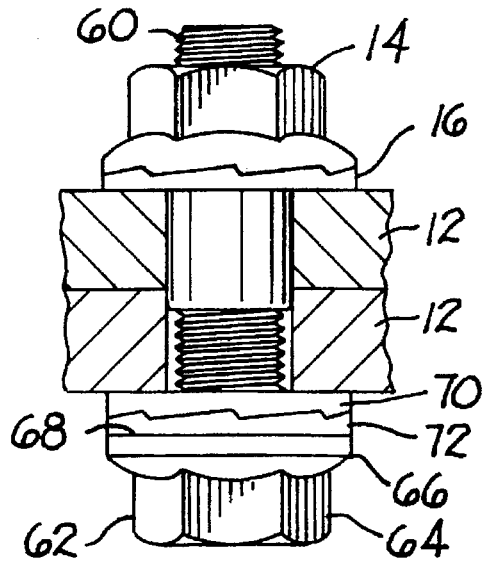
FIG. 10 is a sectional view of a bolt having a flanged camming nut on one end of the bolt and a pair of look washers beneath the bolt head on the opposite end of the bolt.

FIG. 10 illustrates another embodiment of the invention in which nut 14 and washer 16 are mounted on the threaded shank 60 of bolt 62 which is illustrated in FIG. 6. However, in this embodiment of the invention, a pair of wedge locking washers 70 and 72 are mounted between flange 66 of the bolt head and the workpiece. Washers 70 and 72 are of the well known type such as illustrated in my U.S. Pat. No. 5,080,545 which was issued Jan. 14, 1992 for "Lock Washer Assembly Having Wedge Lock Action". As the head of the bolt tends to unwind, the ramps on the two washers slide axially such that the head of the bolt moves away from the workpiece thereby locking it in a wedge type arrangement between the threads of the nut and the camming ramps on washer 70. Consequently, the embodiment of FIG. 10 also provides a permanent fastener assembly because it cannot be unwound except by elongating the bolt shank in some manner.

Figure 11:
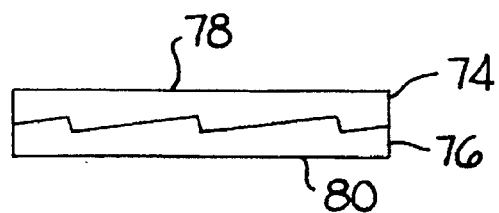
FIG. 11 shows the lock washer of FIG. 10.
Figure 12:
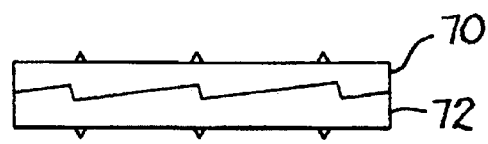
FIG. 12 illustrates an alternative pair of look washers.

FIG. 11 shows an alternative pair of wedge locking washers 74 and 76 which have confronting cam surfaces identical to that of washers 70 and 72, and flat outer faces 78 and 80 for engaging the workpiece and the flange of the bolt head, respectively.

Figure 14:
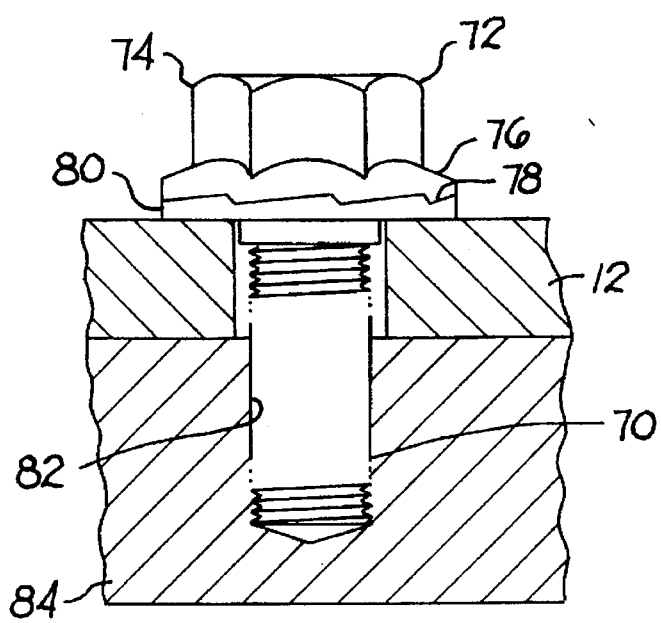
FIG. 14 illustrates the locking bolt of FIG. 9 used in a tapped hole without a nut.

FIG. 14 shows another embodiment of the invention in which bolt 74 is mounted without a nut. The threaded shank 70 is inserted through workpiece 12 and then engaged in a tapped blind hole 82 of a workpiece 84. In this arrangement, the bolt fastens workpiece 12 to workpiece 84 by being threaded into the tapped hole. Any tendency of the bolt head to vibrate loose causes flange 76 on the bolt head to slide up the cammed surface 78 of washer 80 such that the bolt head becomes fastened in a wedge locking arrangement between the washer camming ramps and the threads of tapped hole 82.

Figure 13:
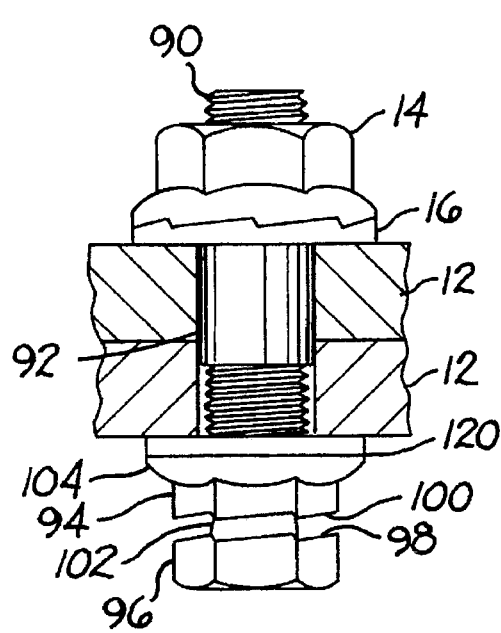
FIG. 13 illustrates a bolt having a flanged camming nut on one end of the bolt and a bolt head having a pair of wedge locking halves, and a washer with a second array of smaller or mini wedge locking cams.

FIG. 13 illustrates a still further embodiment of the invention in which nut 14 and washer 16 are mounted on the threaded shank 90 of a bolt 92 having a pair of cooperating wedge locking hexagonal heads 94 and 96. Hexagonal head 94 is attached to the lower end of the shank. Head 94 is loosely rotatably attached to the shank and has a wedge camming surface 98 identical to the camming surface on washer 16, except on a surface with a smaller diameter. Camming surface 98 cooperates with a complementary wedge camming surface 100 on the fixed hexagonal head 96. The two bolt head halves 94 and 96 are connected by an annular pilot 102 in a manner similar to the manner in which nut head 25 is connected by pilot 46 to washer 16 as illustrated in FIG. 1. This type of arrangement is well known in the art and is illustrated for example, in my U.S. Pat. No. 5,203,656, which was issued April 20, 1993 for self-centering, self-tightening fastener. Camming surfaces 98 and 100 each have eight circumferentially arranged cams each extending through an arc.

Figure 17:
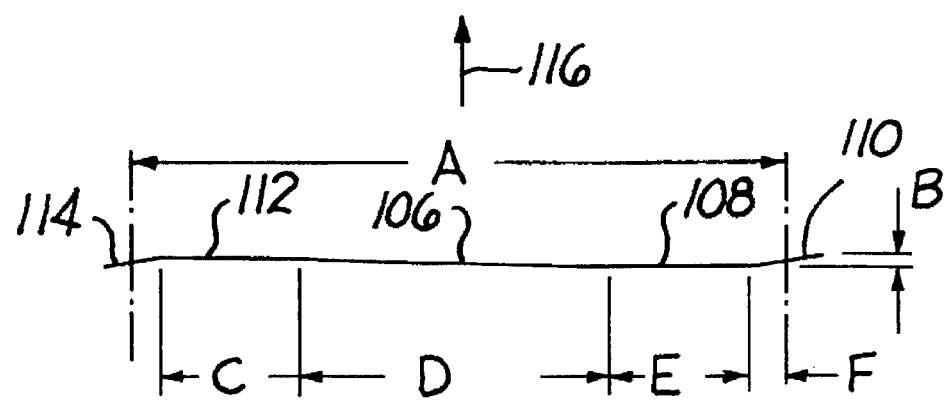
FIG. 17 is an enlarged view of the profile of a typical mini-cam as seen along lines 17—17 of FIG. 16.
Figure 16:
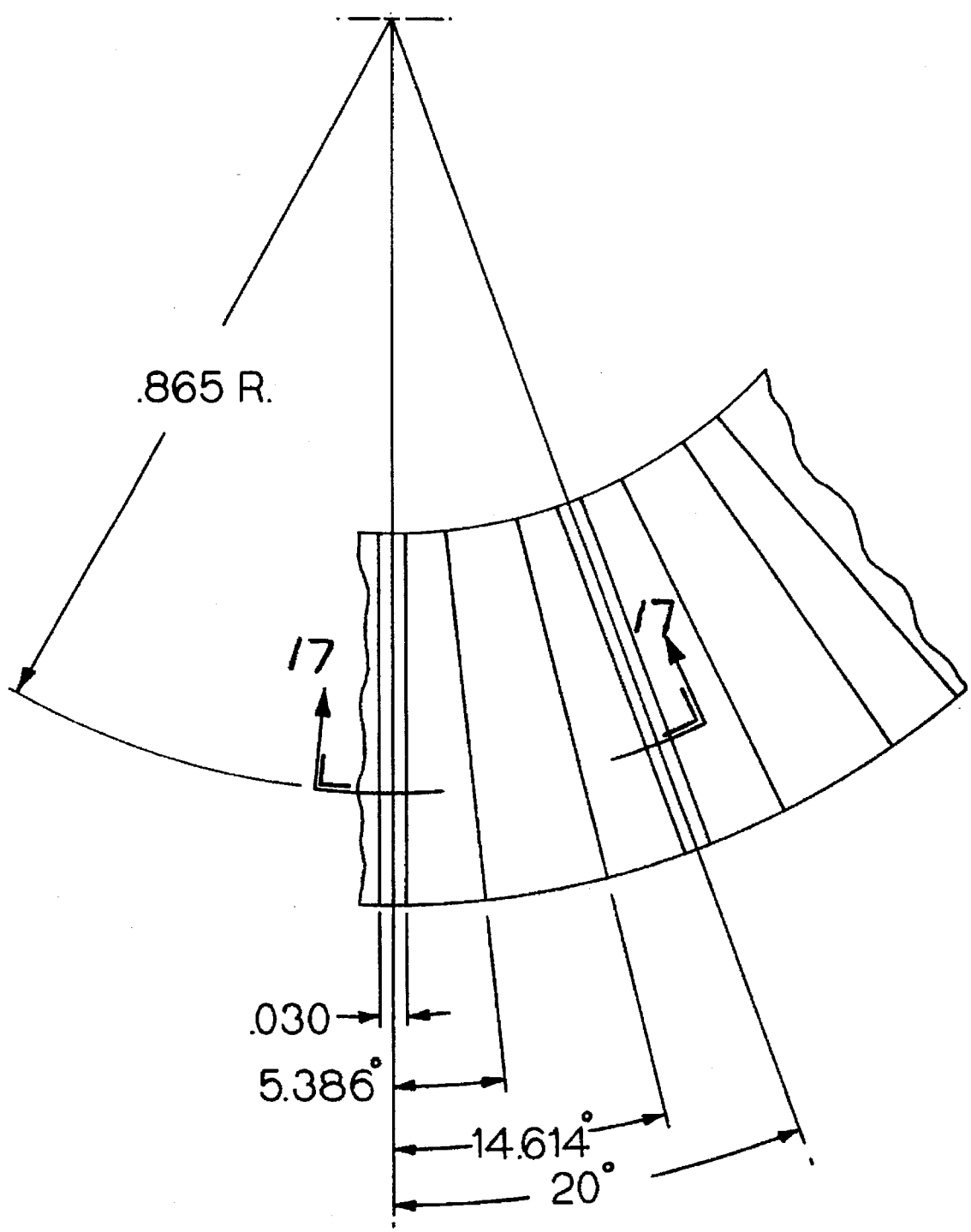
FIG. 16 is a detail of a typical mini cam of the washer of FIG. 15.

In this embodiment of the invention, the loose hexagonal head 94 has an annular integral flange 104 with a diameter larger than the hexagonal head 94 provided with an array of 18 cams comprising 18 equally annularly spaced camming ramps 106 as illustrated in FIGS. 16 and 17. Each relatively elongated ramp 106 is connected by a flat surface 108 to a shoulder 110. The opposite end of the ramp 106 is connected to another flat surface 112 which in turn is connected to shoulder 114. The ramps and shoulders are inclined axially in the direction of the turning axis 116 of the fastener as well as the longitudinal axis of the shank. The ramp and shoulders are inclined in the opposite direction of the confronting ramps and shoulders on bolt halves 94 and 96.

For illustrative purposes, ramp 106 may have a circumferential dimension D of 0.1419" in an arc of 9.23°. Flat surfaces 108 and 112 each have a circumferential dimension of 0.065" in an arc of 5.37°, and shoulders 110 and 114 each have a dimension of 0.015" in an arc of 0.015°. The axial height B of the ramps is substantially less than the height of the ramps on heads 96 and 94. For example, the height of the mini-cam ramps is 0.005".

Figure 15:
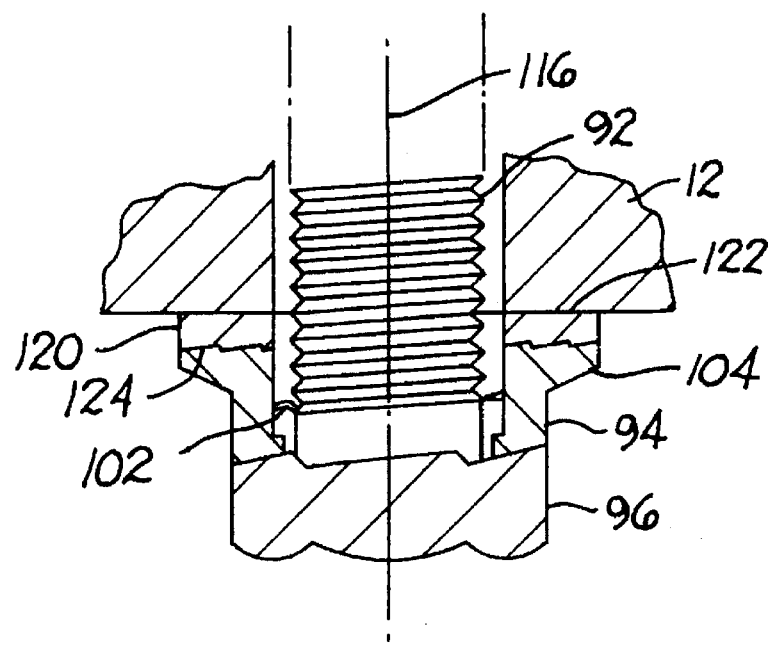
FIG. 15 is a section view of the bolt head of FIG. 13, showing the mini-cams.

Washer 120 is mounted between flange 104 and workpiece 12. The upper face 122 of the washer as viewed in FIG. 15 is flat, the lower face has a camming surface 124 which is complementary to the camming surface of the flange, so that the two camming surfaces cooperate in such a manner that as the fastener head is tightened in a clockwise direction, washer 120 is immediately frictionally connected to the workpiece so that it does not mar or scratch the workpiece. As head 96 is rotated with respect to head 94, the ramps on head 96 slide on the ramps of head 94 until the bolt head is fully tightened.

Any tendency of head 96 to rotate in a loosening direction will cause it to slide axially up on the ramps of head 94, thus causing head 96 to become connected in a wedge like fashion between the larger camming ramps of the washer and the threads of nut 14. This arrangement also provides a permanent fastening device because neither the nut nor the bolt head can be rotated in the unwinding direction. The fastener cannot be loosened unless the shank can be elongated in such a manner that the mini-cam shoulders on the flanged half of head 94 can pass the shoulders on washer 120.

Thus, it is to be understood that I have described a variety of improved wedge locking fastener assemblies in which either the wrench engaging head of the nut or the wrench engaging head of a bolt have a flanged cam locking surface that engages the cam locking surface of a cooperating washer, forming a vibration proof fastener.

The drawings show specific fastener assemblies having an improved wedge locking action compared to other known arrangements. However, the drawings are illustrative of the principles of the invention. Changes and variations can be employed while still practicing the invention.

Having described my invention, I claim:

1. In a wedge-action annular fastener assembly comprising a nut having a threaded internal surface rotatable about an axis, a multi-sided wrench engaging head, a cam end face on the nut;

an annular lock washer being capable of relative axial motion toward or away from the nut; said annular lock washer having a second cam end face interengaged with the cam face on the nut; each of said cam faces comprising a plural number of circumferentially-spaced ramps and a corresponding number of interconnecting shoulders; each ramp being sloped at a relatively slight acute angle to a plane normal to the nut rotational axis; each shoulder being sloped at a relatively steep acute angle to said plane; said shoulders and said ramps being connected at acute angles so that the respective cam surfaces have an undulating contour; the threaded internal surface on said nut comprising a continuous thread having a pitch distance; said shoulders having axial thickness dimensions less than said thread pitch distance; said cam faces being mated so that when the nut is turned in a tightening direction, the nut urges the washer in the tightening direction, and when the nut is turned in the opposite, loosening direction and the washer is fixed with respect to a workpiece, the nut becomes wedged between the ramps on the washer, and the threads on a threaded shank on which the nut is threadably mounted, the improvement comprising:

the nut having an integral annular flange having a diameter at least as great as the multi-sided wrench-engaging head and the cam end face on the nut being formed on the annular flange.

2. A fastener assembly of claim 1, wherein each ramp has a slop angle of approximately 8°, and each shoulder has a slope angle of approximately 45°.

3. A fastener assembly as defined in claim 1, in which the washer has a flat work-engaging surface.

4. A fastener assembly as defined in claim 1, in which the washer has a work-engaging surface with a plurality of radially extending, circumferentially spaced ribs.

5. A fastener assembly as defined in claim 1, including a second fastener member comprising a multi-sided work-engaging head and an integral threaded shank extending from the second fastener member head:

the threaded shank being threadably received in the threaded internal surface of the nut whereby the nut is rotatable about said axis;

the second fastener member head having an integral annular work-engaging flange having a diameter at least as great as the maximum diameter of the second fastener member head;

whereby a workpiece may be clamped between the annular lock washer and the annular flange of the second fastener member head.

6. A fastener assembly as defined in claim 5, including a second lock washer having a cammed face and the second fastener member head having a cam end face movable into slidable wedging contact with the cam face on the second lock washer, whereby the workpiece may be clamped between the annular flange of the nut and the first mentioned lock washer on one side of the workpiece, and the second lock washer and the annular flange of the second fastener member head on the opposite side of the workpiece.

7. A fastener assembly as defined in claim 5, in which the flange of the second fastener member head has a flat face, and including a pair of cooperating wedge acting lock washers disposed between the second fastener member head and the workpiece.

8. A fastener assembly as defined in claim 7, in which one of said pair of lock washers has a flat work-engaging face.

9. A fastener member as defined in claim 7, in which one of said pair of lock washers has a ridged work-engaging face.

10. A wedge action annular fastener assembly as defined in claim 5, including a second lock washer; a flanged rotatable member having a second work-engaging head, the second work-engaging head having a first cam face engageable with the second lock washer and a second cam face slidably engageable with the multi-sided head of the second fastener member hear.

11. A wedge-action fastener assembly comprising:

a threaded shank extendable through a workpiece; a radially enlarged fastener head means turnable around the shank axis to cause the fastener assembly to exert an axial gripping force on the workpiece; and a lock washer interposed between said radially enlarged fastener head means and said workpiece; said radially enlarged fastener head means having a first cam surface facing said lock washer, and said lock washer having a second cam surface facing said fastener head means; each of said cam surfaces comprising a number of circumferentially-spaced ramps and a corresponding number of interconnecting shoulders; each of said ramps being sloped at a relatively slight acute angle to a plane normal to the shank axis; each of said shoulders being sloped at a relatively steep acute angle to said plane; said shoulders and said ramps being connected at acute angles so that the respective cam surfaces have an undulating contour; the threaded internal surface on said shank comprising a continuous thread having a pitch distance; said shoulders having axial thickness dimensions less than said thread pitch distance; said first and second cam surfaces being mated so that when said fastener head means is turned in a tightening direction, the fastener head means urges the washer axially in the tightening direction, and when the fastener head means is turned in the opposite, loosening direction and the washer is fixed with respect to a workpiece, the fastener head means becomes wedged against movement in the loosening direction.

12. The fastener assembly of claim 11, wherein said radially enlarged fastener head means comprises a nut threaded on said shank.

13. The fastener assembly of claim 11, wherein said radially enlarged fastener head means comprises an enlarged head secured to said shank.

* * * * *